US008992652B2

(12) United States Patent
Rolle et al.

(10) Patent No.: US 8,992,652 B2
(45) Date of Patent: Mar. 31, 2015

(54) FILTERING DEVICE, IN PARTICULAR DIESEL PARTICULATE FILTER

(71) Applicant: Mann+Hummel GmbH, Ludwigsburg (DE)

(72) Inventors: Arndt-Udo Rolle, Stuttgart (DE); Frank Ehlen, Neunkirchen (DE); Kathrin Lichtenwalter, Gerlingen (DE); Jochen Linhart, Schwaikheim (DE); Nadine Dietsch, Ilsfeld (DE)

(73) Assignee: Mann+Hummel GmbH, Ludwigsburg (DE)

( * ) Notice: Subject to any disclaimer, the term of this patent is extended or adjusted under 35 U.S.C. 154(b) by 49 days.

(21) Appl. No.: 13/716,715

(22) Filed: Dec. 17, 2012

(65) Prior Publication Data

US 2013/0152530 A1    Jun. 20, 2013

(30) Foreign Application Priority Data

Dec. 16, 2011    (DE) .......................... 10 2011 121 186

(51) Int. Cl.
| | |
|---|---|
| B01D 50/00 | (2006.01) |
| B01D 39/14 | (2006.01) |
| B01D 39/06 | (2006.01) |
| B01D 39/20 | (2006.01) |
| B01D 24/00 | (2006.01) |
| B01D 46/52 | (2006.01) |
| B01D 35/00 | (2006.01) |
| B01D 37/02 | (2006.01) |
| B01D 27/06 | (2006.01) |

(52) U.S. Cl.
CPC ............ *B01D 46/528* (2013.01); *B01D 35/005* (2013.01); *B01D 37/025* (2013.01); *B01D 27/06* (2013.01); *B01D 2201/0415* (2013.01)
USPC ................. 55/523; 55/522; 55/524; 422/169; 422/170; 422/171; 422/172; 422/177; 422/178; 422/179; 422/180; 422/181; 422/182

(58) Field of Classification Search
CPC ..... F01N 3/0218; F01N 3/0217; F01N 3/022; F01N 3/0226; B01D 46/527; B01D 46/528; B01D 46/52
See application file for complete search history.

(56) References Cited

U.S. PATENT DOCUMENTS

| | | | |
|---|---|---|---|
| 3,020,977 A | 2/1962 | Huppke et al. | |
| 5,865,864 A * | 2/1999 | Bruck | ............................ 55/482 |
| 6,544,310 B2 * | 4/2003 | Badeau et al. | ............... 55/385.3 |
| 7,055,314 B2 * | 6/2006 | Treiber | ........................... 60/297 |
| 7,563,414 B2 * | 7/2009 | Bruck | ........................... 422/180 |
| 7,700,050 B2 * | 4/2010 | Bruck et al. | .................. 422/180 |
| 8,075,658 B2 | 12/2011 | Volkmer et al. | |
| 2003/0086837 A1 * | 5/2003 | Bruck et al. | .................. 422/180 |
| 2008/0141638 A1 | 6/2008 | Linhart et al. | |
| 2010/0034981 A1 | 2/2010 | Franz | |
| 2010/0078379 A1 * | 4/2010 | Rocklitz | .................... 210/493.1 |
| 2010/0129271 A1 * | 5/2010 | Micke et al. | .................. 422/180 |

* cited by examiner

*Primary Examiner* — Amber Orlando
(74) *Attorney, Agent, or Firm* — James Hasselbeck

(57) ABSTRACT

A filtering device features a ceramic filter body for filtering a fluid flow, the filter body consisting of a wavy layer and a flat layer and the wavy and flat layer being wound in a spiral-shaped manner. The wave length of the waves increases from the inside to the outside with increasing distance to the longitudinal axis of the filter body such that the wave troughs and the wave peaks of at least two radially adjacent windings each lie on a common radial plane.

10 Claims, 1 Drawing Sheet

FILTERING DEVICE, IN PARTICULAR DIESEL PARTICULATE FILTER

CROSS REFERENCE TO RELATED APPLICATIONS

This application claims the benefit of German patent application no. DE 10 2011 119 986.5 filed Dec. 16, 2011, the entire disclosure of which is incorporated herein by reference.

TECHNICAL FIELD

The invention relates to a filtering device, in particular a diesel particulate filter.

BACKGROUND OF THE INVENTION

DE 10 2008 036 379 A1 describes a method for manufacturing a ceramic filter element in an exhaust gas filter of an internal combustion engine, in particular of a diesel particulate filter. To manufacture the filter element, a combustible, non-ceramic filter medium is formed to a winding and soaked with a ceramic slurry. The soaked winding is then dried and sintered. In this connection, the filter web formed to a winding consists of a flat layer and a sinusoidal wavy layer, the wave peaks and wave troughs contacting in wound state the radially inside and outside lying flat layer, so that in axial direction extending flow channels are formed. The properties of the wound filter depend decisively on the ceramic slurry as well as on the non-ceramic carrier layer and furthermore on the geometric proportions, for example on the relation between wave width and wave height in the wavy layer.

If used as diesel particulate filter, the filter element has to feature a relatively high mechanical strengths to be able to withstand occurring forces and loads during operation. The geometry and any other parameters of the filter element have to be adapted accordingly.

The object of the invention is to realize a filtering device with simple measures that withstands the high mechanical loads.

SUMMARY OF THE INVENTION

The filtering device according to the invention is in particular suited for being used as exhaust gas filter in an internal combustion engine, preferably as diesel particulate filter. Furthermore, other applications such as gas or liquid filters can be considered, in particular in cases when the filtering device is exposed to extreme mechanical load.

The filtering device features a ceramic filter body for filtering a fluid flow, consisting of a wavy layer and a flat layer which adjoin each other wound in a spiral-shaped manner. The individual waves of the wavy layer form on the side facing the flat layer as well as facing away from it flow channels for the fluid flow which extend in axial direction. The flow channels are usually closed on one side so that inflowing fluid is forced to penetrate through the walls into adjacent flow channels via which the cleaned fluid is discharged.

In the filtering device according to the invention the wave length in the wavy layer expands from the inside to the outside with increasing distance to the longitudinal axis of the filter body such that the wave troughs and the wave peaks of at least two radially adjacent windings each lie on a common radial plane. In this way, a kind of timber-framed structure with a coordinated alignment of the wave troughs and wave peaks covering at least two windings is realized in radial direction in such a way that in radial direction a wave peak of the radially inside winding contacts a wave trough of the radially outside winding so that the top of the wave peak and the bottom of the wave trough are only separated from each other by the flat layer in-between. Due to the adjoining wave peaks and wave troughs in the windings, an especially strong structure is realized in radial direction.

This structure is obtained due to the changing relation between wave height and wave length as the wave length increases radially from the inside to the outside so that within a defined angular sector in the at least two considered windings the same number of waves per winding exists. Expediently, all windings of the filter body are aligned in such a way that the wave troughs and the wave peaks within a sector lie each on a common radial plane, as described above. This ensures that the wound filter can withstand a radial load from the outside to the inside without damage.

Basically, embodiments with only one part of the windings having wave peaks and wave troughs aligned to each other are possible, whereas the other windings do not feature such a variable relation between wave peaks and wave troughs, but for example a constant relation.

According to another appropriate embodiment it is intended that the height of all windings is constant. With increasing distance from the inside to the outside, only the wave length changes and not the wave height. This means that the relation between the wave length and the wave height becomes increasingly larger from the inside to the outside. The ratio of wave length to wave height is at least in the inner area of the spirally wound filter body expediently smaller than two so that the wave flanks are relatively steep in relation to the flat layer and feature therefore a relatively large gradient. This enhances the stability in radial direction. It can be advantageous to maintain the ratio of wave length to wave height smaller than two over a relatively large area of the wound filter, possibly over the whole length of the filter web, consisting of wavy layer and flat layer.

According to another advantageous embodiment it is intended that the wavy layer has a sinusoidal wave form, wherein basically also other wave forms can be considered, for example a rectangular or at least approximately rectangular wave form.

As in the outer area with coordinated waves of the wavy layer in radially adjacent windings the wave length increases and the flanks are therefore less steep in relation to the intermediate flat layer, the radial stability in this outer area decreases slightly due to the design. To compensate this decrease in stiffness it can be appropriate to provide at least the flat layer in the outer peripheral area with a reinforced wall thickness, for example in such a way that the wall thickness increases continuously or discontinuously from the inside to the outside. Alternatively or additionally, also the wavy layer in the outer peripheral area of the wound filter can be provided with a larger wall thickness.

But basically embodiments having a wall thickness of the flat layer and/or wavy layer that is constant over the whole length of the respective web can be considered, too.

It can be advantageous, for a better flow in radial direction, to provide a different porosity of the filter material in the windings depending on the radial distance to the central axis and longitudinal axis, respectively, of the filter body. For example, if the filter body is flowed through radially from the inside to the outside by the fluid to be cleaned, it is then appropriate to provide a porosity of the filter material that decreases from the inside to the outside so that the corresponding pressure loss supports the flow from the inside to the outside. Conversely, a porosity that decreases radially from the outside to the inside is advantageous in cases where the filter body is also flowed through radially from the outside to the inside.

According to another appropriate embodiment it is intended that the flat layer has at least sectionwise, possibly over their whole length, a porosity that differs from that of the wavy layer. In this connection, it can be particularly appropriate to provide the flat layer with a lower porosity than the wavy layer to facilitate the radial penetration of the fluid to be cleaned. Nevertheless, it is also possible to provide an equally high porosity in the flat layer and the wavy layer or possibly a higher porosity in the flat layer than in the wavy layer.

BRIEF DESCRIPTION OF THE DRAWINGS

Further advantages and appropriate embodiments can be taken from the claims, the description of the figures and the drawings. Shown is in:

DETAILED DESCRIPTION

Figure 1:
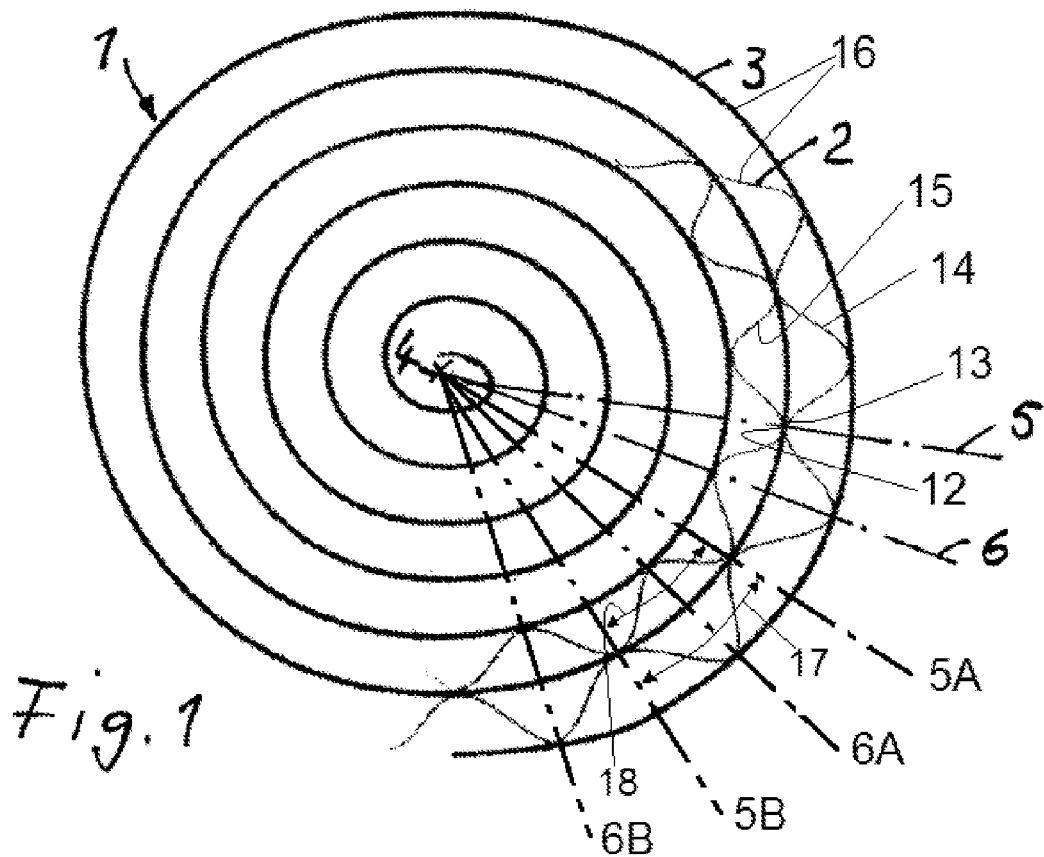
FIG. 1 depicts a spirally wound filter body with a sinusoidal wavy layer and a flat layer, represented in top view, wherein the wave length in the wavy layer increases from the inside to the outside.

The filter body 1 shown in FIG. 1 is part of a filtering device, in particular of a diesel particulate filter, in an internal combustion engine and features two adjacent layers 2 and 3 which are each spirally wound. The layer 2 is designed as a sinusoidal wavy layer, the layer 3 as flat layer. The layers 2 and 3 consist in particular of a combustible, non-ceramic filter medium each, as for example a filter paper which is soaked with a ceramic slurry, wherein the soaked winding is then dried and sintered.

The wave form in the wavy layer 2 is radially defined by the outside flat layer as well as by the inside flat layer. As a result, flow channels are created in axial direction of the filter body 1, wherein these flow channels are usually alternately opened and closed on one front face, respectively. The medium flowing in axially via a front face is thus forced to flow radially through the limiting walls of the flow channels so that the filtration effect is realized. The cleaned medium can then flow out axially from the filter body 1 via these adjacent flow channels.

To enhance the stability of the filter body 1, the wave length 17, 18 of the sinusoidal waves in the wavy layer 2 increases from the inside to the outside with increasing radial distance to the central longitudinal axis 4 of the filter body which extends through the center of the filter body 1. The wave length 17, 18 of the waves increases in such a way that the wave troughs 13 and the wave peaks 12 of at least two radially adjacent windings 14, 15 each lie on a common radial plane 5, 5A, 5B etc. The radial planes 5, 5A, 5B, 6, 6A, 6B intersect at the longitudinal axis and extend radially outwardly from the longitudinal axis 4. In FIG. 1 are drawn exemplary radial planes 5, 5A 5B which extend through the longitudinal axis 4 of the filter body and cut radially wave troughs of outer wavy layer 14 and wave peaks of adjacent inner wavy layer 15. Similarly exemplary radial planes 6, 6A, 6B extend through the longitudinal axis 4 of the filter body and cut radially wave peaks of outer wavy layer 14 and wave troughs of adjacent inner wavy layer 15. Wave troughs and peaks are aligned such that radial planes can be drawn through longitudinal axis 4 of the filter body cutting radially through wave troughs and wave peaks, respectively, in radially directly adjacent windings of the wavy layer 2 of the filter body 1. It can be seen that, for example, along the radial plane 5 in the outer wavy layer 14 of the spiral winding 16 and the nearest, radially inside offset wavy layer 15 of the spiral winding 16 a wave peak 12 and a wave trough 13 come into contact directly and that they are separated only by the intermediate flat layer 3. In this way, a timber-framed effect is created which contributes substantially to an increase in stability of the filter body 1, seen in particular in radial direction. The contacting wave peaks and wave troughs in adjacent windings are realized by the ever increasing wave length in the wavy layer 2. As can be seen in FIG. 1, the wavy length 17 of the outer wavy layer 14 is greater in length the wavy length 18 of the adjacent inner wavy layer 15, such the wavy length increases along the spiral winding 16 from the radial inside to the radial outside of the filter element 1, the radial direction taken from the central longitudinal axis 4 along any of the radial planes 5, 6, 5A, 6A, 5B, 6B.

The wave height in the wavy layer 2, which defines the radial distance between adjacent windings of the flat layer 3, is, according to a first advantageous embodiment, at least sectionwise constant so that a changing relation between wave length and wave height is realized from radially inside to the outside. This amounts preferably at least in the inner area of the spirally wound filter body to less than two. wherein in the radially outer area a relation between wave length and wave height larger than two can also be considered because of the increasing wave length.

According to an alternative embodiment, the radial distance between adjacent flat layers 3 is at least sectionwise not constant, but changing, for example in such a way that with increasing radial distance to the longitudinal axis 4 of the filter body the wave height increases, too. In this case, a constant relation between wave length and wave height can be realized at least approximately.

Figure 2:
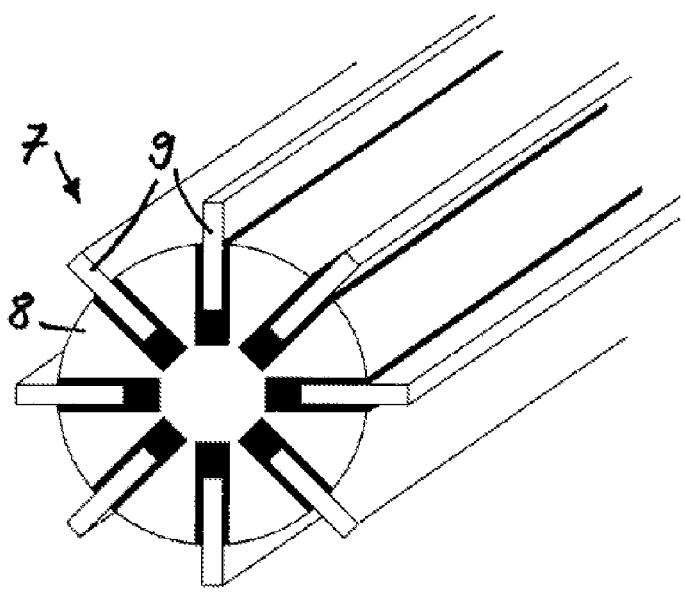
FIG. 2 a part of a device for manufacturing a spirally wound filter body according to FIG. 1.

FIG. 2 shows a roller 7 as part of a device for manufacturing adapted wave distances in a wavy layer. The device comprises in particular two adjacent, parallel aligned rollers 7 of this kind between which a layer is passed through, wherein the rollers 7 turn in the opposite direction and radially protruding roller ridges 9 act on the layer, thus creating the wave form.

The roller ridges 9 are fixed on a roller body 8 and protrude radially in relation to the outer face of the roller body 8. The roller ridges 9 are designed as sliders and their radial position can be modified in relation to the roller body 8. With increasing radial protrusion of the roller ridges 9 in relation to the roller body 8, the wavy length in the wavy layer increases also, which are created by the interacting rollers 7.

The invention claimed is:

1. A diesel particulate filter, comprising:
   a ceramic spirally wound filter body for filtering a fluid flow, the filter body having a longitudinal axis extending through a center of the filter body, the ceramic filter body including
      a wavy layer of filter material having a porosity and forming wave troughs and wave peaks; and
      a flat layer of filter material having a porosity; and
      wherein the wavy layer and the flat layer are overlaid onto each other and spirally wound around the longitudinal axis to form a spiral winding so that waves of the wave troughs and or peaks of the wavy layer form flow channels on the side facing the flat layer and/or facing away from it;
   wherein the wavy length in the wavy layer increases along the spiral winding from the inside to the outside with increasing distance to the longitudinal axis of the filter body in such a way that the wave troughs of a first portion of wavy layer are radially aligned with and resting upon adjacent respective wave peaks of an adjacent portion of the wavy layer, the first portion wave troughs abutting against a first side of the flat layer and radially aligned with the adjacent portion wave peaks abutting against an opposing second side of the flat layer;

wherein wave troughs and corresponding wave peaks of at least radially adjacent windings lie each on a respective one of a plurality of common radial planes, the plurality of common radial planes intersecting at the longitudinal axis.

2. The diesel particulate filter according to claim 1, wherein the wave troughs and wave peaks of all adjacent spirally wound windings lie each on a common radial plane.

3. The diesel particulate filter according to claim 1, wherein the porosity of the filter material of at least one filter web changes from the inside to the outside.

4. The diesel particulate filter according to claim 3, wherein the porosity of the filter material of at least one of the layers decreases in a direction from a radial inside to a radial outside of the filter body.

5. The diesel particulate filter according to claim 1, wherein the flat layer has a porosity that differs, at least sectionwise, from the wavy layer.

6. The diesel particulate filter according to claim 1, wherein the porosity of the flat layer is lower than the porosity of the wavy layer.

7. The diesel particulate filter according to claim 1, wherein the wavy layer has a sinusoidal wave form.

8. The diesel particulate filter according to claim 1, wherein the flat layer is reinforced in its radially outer peripheral area by increasing continuously or discontinuously layer thickness of the spirally wound flat layer along the spiral winding of the flat layer from a radially inner end of the flat layer to a radially outer end of the flat layer, thereby increasing the radial stability and stiffness of radially outer portions of the spirally wound flat layer relative to radially inner portions of the spirally wound flat layer.

9. The diesel particulate filter according to claim 1, wherein the radial height of all windings is constant.

10. The diesel particulate filter according to claim 4, wherein the wave troughs and wave peaks of all adjacent spirally wound windings lie each on a common radial plane;

wherein the porosity of the flat layer is lower than the porosity of the wavy layer;

wherein the ratio of wave length to wave height is at least in an inner area of the spirally wound filter body less than two; and wherein the wavy layer has a sinusoidal wave form.

* * * * *